US012463715B2

United States Patent
Wigard et al.

(10) Patent No.: US 12,463,715 B2
(45) Date of Patent: Nov. 4, 2025

(54) USER EQUIPMENT AUTONOMOUS ADJUSTMENT OF MEASUREMENT WINDOW FOR NON-TERRESTRIAL NETWORKS

(71) Applicant: Nokia Technologies Oy, Espoo (FI)

(72) Inventors: Jeroen Wigard, Klarup (DK); Mads Lauridsen, Gistrup (DK)

(73) Assignee: Nokia Technologies Oy, Espoo (FI)

( * ) Notice: Subject to any disclaimer, the term of this patent is extended or adjusted under 35 U.S.C. 154(b) by 354 days.

(21) Appl. No.: 18/246,343

(22) PCT Filed: Sep. 23, 2021

(86) PCT No.: PCT/FI2021/050623
§ 371 (c)(1),
(2) Date: Mar. 23, 2023

(87) PCT Pub. No.: WO2022/079344
PCT Pub. Date: Apr. 21, 2022

(65) Prior Publication Data
US 2023/0396328 A1 Dec. 7, 2023

Related U.S. Application Data

(60) Provisional application No. 63/091,658, filed on Oct. 14, 2020.

(51) Int. Cl.
*H04B 7/185* (2006.01)
*H04B 7/195* (2006.01)
*H04W 84/06* (2009.01)

(52) U.S. Cl.
CPC ..... *H04B 7/18519* (2013.01); *H04B 7/18589* (2013.01); *H04B 7/195* (2013.01); *H04W 84/06* (2013.01)

(58) Field of Classification Search
CPC H04B 7/18519; H04B 7/18589; H04B 7/195; H04B 7/1851; H04B 7/1853;
(Continued)

(56) References Cited

U.S. PATENT DOCUMENTS

2018/0013484 A1 1/2018 Vasavada et al.
2020/0275299 A1* 8/2020 Gheorghiu .......... H04W 72/542
(Continued)

FOREIGN PATENT DOCUMENTS

WO 2020/067973 A1 4/2020
WO 2020/082211 A1 4/2020

OTHER PUBLICATIONS

"3rd Generation Partnership Project; Technical Specification Group Radio Access Network; Solutions for NR to support non-terrestrial networks (NTN) (Release 16)", 3GPP TR 38.821, V16.0.0, Dec. 2019, pp. 1-140.
(Continued)

*Primary Examiner* — Rasheed Gidado
(74) *Attorney, Agent, or Firm* — Lippes Mathias LLP (57) ABSTRACT

A method of operating a user equipment (UE) having a serving cell and a neighbor cell included in a wireless communications system, includes receiving (S410), by the UE, parameters defining a measurement window; receiving, by the UE, one or more timing thresholds; performing a measurement operation with respect to the neighbor cell by measuring (S415) reference information of the neighbor cell in accordance with the measurement window; determining, by the UE, whether to adjust one or more of the parameters of the measurement window based on a temporal position of the reference information and the one or more timing thresholds; and adjusting one or more of the parameters of the measurement window based on the determining.

14 Claims, 6 Drawing Sheets

(58) Field of Classification Search
CPC . H04W 84/06; H04W 36/0094; H04W 24/10; H04W 56/00
See application file for complete search history.

(56) References Cited

U.S. PATENT DOCUMENTS

| | | | |
|---|---|---|---|
| 2021/0337455 A1* | 10/2021 | Zhou | H04W 36/0061 |
| 2022/0225150 A1* | 7/2022 | Zheng | H04W 24/08 |
| 2022/0232447 A1* | 7/2022 | Lu | H04W 36/302 |
| 2022/0279404 A1* | 9/2022 | Wakabayashi | H04W 36/08 |

OTHER PUBLICATIONS

"Discussion on SSB measurement in NTN", 3GPP TSG-RAN2 Meeting #108, R2-1915189, Agenda: 6.6.4.3, Huawei, Nov. 18-22, 2019, pp. 1-5.

"3rd Generation Partnership Project; Technical Specification Group Radio Access Network; NR; Requirements for support of radio resource management (Release 16)", 3GPP TS 38.133, V16.3.0, Mar. 2020, 1169 pages.

"3rd Generation Partnership Project; Technical Specification Group Radio Access Network; NR; Radio Resource Control (RRC) protocol specification (Release 16)", 3GPP TS 38.331, V16.1.0, Jul. 2020, pp. 1-906.

International Search Report and Written Opinion received for corresponding Patent Cooperation Treaty Application No. PCT/FI2021/050623, dated Dec. 23, 2021, 14 pages.

Extended European Search Report received for corresponding European Patent Application No. 21879587.0, dated Oct. 2, 2024, 14 pages.

"Initial Discussion for Connected Mode in NTN", 3GPP TSG-RAN WG2 Meeting #111 electronic, R2-2006629, Agenda: 8.10.3.2, CATT, Aug. 17-28, 2020, 5 pages.

"Discussion on delay difference on measurements for NTN", 3GPP TSG RAN WG2#111-e, R2-2007955, Agenda: 8.10.3.2, Asia Pacific Telecom, Aug. 17-28, 2020, 4 pages.

\* cited by examiner

USER EQUIPMENT AUTONOMOUS ADJUSTMENT OF MEASUREMENT WINDOW FOR NON-TERRESTRIAL NETWORKS

RELATED APPLICATION

This application was originally filed as PCT Application No. PCT/FI2021/050623 on Sep. 23, 2021, which claims priority from U.S. Provisional Application No. 63/091,658, filed on Oct. 14, 2020, each of which is incorporated herein by reference in its entirety.

TECHNICAL FIELD

One or more example embodiments relate generally to wireless communications and, more specifically, to Third Generation Partnership Project (3GPP) Fifth Generation (5G) New Radio (NR) radio access technology (RAT) support for non-terrestrial networks (NTNs).

BACKGROUND

For Third Generation Partnership Project (3GPP) Fifth Generation (5G) New Radio (NR) radio access networks (RANs) that include non-terrestrial networks (NTNs), base stations (e.g., next generation Node Bs (gNBs)) may be located on NTN devices, examples of which include, but are not limited to, satellites, such as low earth orbit (LEO) satellites. For example, a satellite operating as an NTN device may use one or more beams directed towards the Earth to support wireless communications for user equipment (UEs) located within the geographical area of a cell associated with the satellite.

LEO satellites may move relatively quickly (e.g., around 7.5 km/s) relative to the earth. Accordingly, LEO satellites acting as NTN devices may support a 5G NR cell in at least two different ways: earth-fixed cell and earth-moving cell. For example, an LEO satellite may support an earth-fixed cell by constantly adjusting the direction in which 5G NR beams of the LEO satellite point, relative to the LEO satellite, such that the beams constantly point toward a fixed position on the surface Earth as the LEO satellite moves relative to the surface of the earth. Accordingly, the earth-fixed cell remains substantially stationary relative to the surface of the earth, even as the LEO satellite moves relative to the surface of the earth. Alternatively, an LEO satellite may support an earth-moving cell by maintaining the direction in which 5G NR beams of the LEO satellite point, relative to the LEO satellite, in a fixed manner. Accordingly, the earth-moving cell moves relative to the surface of the earth as the LEO satellite moves relative to the surface of the earth.

The movement of the satellites, and thus the movement of the signals (e.g., beams) from the satellite-based gNBs, may result in a substantial increase in the number of handover events. For example, the number of mobility events may depend on the cell sizes, which may be, for example, within the range of a radius of 30 km to a radius of several 100 km. In conventional terrestrial networks, handovers are based on neighbor cell measurements made by the UE, which are reported to the network when a certain measurement event is triggered, like a neighbor cell exhibiting a signal strength measurements that are better than those of the serving cell by more than a threshold amount. Similarly, idle UEs measure neighbor cells in order to determine when to reselect a new serving cell. However, unlike conventional terrestrial networks in which the UEs may move while the base stations remain largely stationary, with NTNs, the satellite-based gNBs move as well. Thus, in order to support NTN in 5G NR communications systems, it may be desirable to determine reliable techniques for measuring neighboring cells which take the movement of the satellite-based gNBs into account.

SUMMARY

According to at least some example embodiments, a method of operating a user equipment (UE) having a serving cell and a neighbor cell included in a wireless communications system includes receiving, by the UE, parameters defining a measurement window; receiving, by the UE, one or more timing thresholds; performing a measurement operation with respect to the neighbor cell by measuring reference information of the neighbor cell in accordance with the measurement window; determining, by the UE, whether to adjust one or more of the parameters of the measurement window based on a temporal position of the reference information and the one or more timing thresholds; and adjusting one or more of the parameters of the measurement window based on the determining.

The wireless communications system may be a wireless non-terrestrial network (NTN) communications system, the wireless communications system may further include one or more satellites, and the UE communicates with at least one of the serving cell and the neighbor cell via at least one of the one or more satellites.

One or more satellites may be low earth orbit (LEO) satellites.

The serving cell may be a cell of a serving base station (BS), and the method may further include reporting, by the UE, the adjusted one or more parameters of the measurement window to the serving BS.

The measurement window may be a synchronization signal block (SSB) measurement timing configuration (SMTC) window.

The reference information of the neighbor cell may be an SSB of the neighbor cell.

The one or more timing thresholds may include a first timing threshold, the parameters of the measurement window may include a temporal position of the of the measurement window, the determining may include performing a comparison based on the first timing threshold and a first timing difference, the first timing difference may be an absolute value of a difference between a temporal position of the SSB and a temporal position of the SMTC window, and the adjusting may include adjusting the temporal position of the SMTC window such that the temporal position of the SMTC window is closer to the temporal position of the SSB, in response to determining that the first timing difference is not less than the first timing threshold.

The parameters of the measurement window may further include a duration of the of the measurement window, and the adjusting may include decreasing the duration of the SMTC window in response to determining that the first timing difference has been less than the first timing threshold for at least a reference number of iterations of performing the measurement operation.

The one or more timing thresholds may be a plurality of timing thresholds and may further include a second timing threshold that is greater than the first timing threshold, the parameters of the measurement window may further include a duration of the of the measurement window, the determining may further include performing a comparison based on the second timing threshold and the first timing difference, and the adjusting may further include increasing the duration of the SMTC window in response to determining that the first timing difference is not less than the second timing threshold.

The serving cell may be a cell of a serving base station (BS), and the parameters defining the measurement window and the one or more timing thresholds may be received at the UE from the serving BS.

According to at least some example embodiments, a user equipment (UE) having a serving cell and a neighbor cell included in a wireless non-terrestrial network (NTN) communications system, includes memory storing computer-executable instructions; and a processor configured to execute the computer-executable instructions, wherein the computer-executable instructions include receiving, by the UE, parameters defining a measurement window, receiving, by the UE, one or more timing thresholds, performing a measurement operation with respect to a neighbor cell by measuring reference information of the neighbor cell in accordance with the measurement window, determining, by the UE, whether to adjust one or more of the parameters of the measurement window based on a temporal position of the reference information and the one or more timing thresholds, and adjusting one or more of the parameters of the measurement window based on the determining.

The wireless NTN communications system may further include one or more satellites, and communications received at the UE from at least one of the serving cell and the neighbor cell may be received via at least one of the one or more satellites.

According to at least some example embodiments, one or more satellites are low earth orbit (LEO) satellites.

The computer-executable instructions may further include reporting the adjusted one or more parameters of the measurement window to a base station of a serving cell of the UE.

The measurement window may be a synchronization signal block (SSB) measurement timing configuration (SMTC) window.

The reference information of the neighbor cell may be an SSB of the neighbor cell.

The one or more timing thresholds may include a first timing threshold, the parameters of the measurement window may include a temporal position of the of the measurement window, the determining may include performing a comparison based on the first timing threshold and a first timing difference, the first timing difference may be an absolute value of a difference between a temporal position of the SSB and a temporal position of the SMTC window, and the adjusting may include adjusting the temporal position of the SMTC window such that the temporal position of the SMTC window is closer to the temporal position of the SSB, in response to determining that the first timing difference is not less than the first timing threshold.

The parameters of the measurement window may further include a duration of the of the measurement window, and the adjusting may include decreasing the duration of the SMTC window in response to determining that the first timing difference has been less than the first timing threshold for at least a reference number of iterations of performing the measurement operation.

The one or more timing thresholds may be a plurality of timing thresholds and may further include a second timing threshold that is greater than the first timing threshold, the parameters of the measurement window may further include a duration of the of the measurement window, the determining may further include performing a comparison based on the second timing threshold and the first timing difference, and the adjusting may further include increasing the duration of the SMTC window in response to determining that the first timing difference is not less than the second timing threshold.

The receiving of the parameters defining the measurement window and the one or more timing thresholds may include receiving the parameters defining the measurement window and the one or more timing thresholds from a base station of the serving cell of the UE.

According to at least some example embodiments, a user equipment (UE) having a serving cell and a neighbor cell included in a wireless non-terrestrial network (NTN) communications system includes receiving means for receiving parameters defining a measurement window and receiving one or more timing thresholds; measurement means for performing a measurement operation with respect to the neighbor cell by measuring reference information of the neighbor cell in accordance with the measurement window; determining means for determining whether to adjust one or more of the parameters of the measurement window based on a temporal position of the reference information and the one or more timing thresholds; and adjusting means for adjusting one or more of the parameters of the measurement window based on the determining.

According to at least some example embodiments, a method of operating a network element of a serving cell in a wireless communications system includes transmitting, from the network element to a user equipment (UE), initial parameters defining a measurement window; and receiving, from the UE, adjusted parameters, the adjusted parameters being parameters of the measurement window that have been adjusted by the UE.

According to at least some example embodiments, a network element of a serving cell in a wireless communications system includes memory storing computer-executable instructions; and a processor configured to execute the computer-executable instructions, wherein the computer-executable instructions include transmitting, from the network element to a user equipment (UE), initial parameters defining a measurement window, and receiving, from the UE, adjusted parameters, the adjusted parameters being parameters of the measurement window that have been adjusted by the UE.

According to at least some example embodiments, a network element of a serving cell in a wireless communications system includes transmitting means for transmitting, to a user equipment (UE), initial parameters defining a measurement window; and receiving means for receiving, from the UE, adjusted parameters, the adjusted parameters being parameters of the measurement window that have been adjusted by the UE.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of this disclosure.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

It should be understood that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

1. Overview of Signal Measurement Window Adjustment Method According to at Least Some Example Embodiments.

One or more example embodiments refer to a signal measurement window adjustment method of a user equipment (UE) in a wireless non-terrestrial network (NTN) communications system. According to at least one example embodiment, the signal measurement window adjustment method addresses reference information acquisition timing issues that may be experienced by the UE in the NTN communications system due to one or both of (i) a serving base station (e.g., a serving next generation Node Bs (gNBs)) of a serving cell of the UE and (ii) a neighboring base station (e.g., a neighboring gNB) of a neighboring cell, which the UE is attempting to measure, being embodied by a rapidly moving NTN device (e.g., a low earth orbit (LEO) satellite) or communicating with a UE via a rapidly moving NTN device (e.g., where one or both of the serving gNB and the neighbor gNB communicate with a UE via an NTN device).

As will be discussed in greater detail below with reference to FIG. 2, one example of the aforementioned reference information acquisition timing issues is a temporal misalignment between:

a) the timing of an unadjusted measurement window of the UE (e.g., the measurement window defined by temporal parameters received at the UE from the core network (CN) and/or a serving cell of the UE); and b) the timing with which reference information (e.g., a synchronization signal block (SSB)) of the neighboring cell of the UE is provided (e.g., by the CN and/or the neighboring cell).

According to at least one example embodiment, the signal measurement window adjustment method includes the UE intelligently, and autonomously, aligning a signal measurement window (e.g., a SSB measurement timing configurations (SMTC) window) of the UE with reference information of the neighboring cell (e.g., an SSB of the neighboring cell) by adjusting a temporal position and/or size of the signal measurement window so as to facilitate the UE's successful acquisition of the reference information of the neighboring cell. The UE may then use the obtained reference information of the neighboring cell to measure or calculate attributes of signals of the neighboring cell, such as reference signal receive power (RSRP) and/or reference signal receive quality (RSRQ), which may be used at the UE for a number of purposes including, for example, determining whether to initiate a handover operation with respect to the neighboring cell.

According to at least some example embodiments, example technical advantages of the aforementioned signal measurement window adjustment method include, but are not limited to, the following:

Alignment of an SMTC window of a UE with respect to an SSB of a neighboring cell of the UE may be performed with limited control signaling overhead;

The alignment may be performed without the need to use UE location information (e.g., a location of the UE);

The alignment may be performed without continuous signaling of parameters of the adjusted SMTC window to the UE (e.g., from the CN and/or a gNB); and The alignment may be performed without continuous estimation of the parameters of the adjusted SMTC (e.g., at the CN and/or a gNB).

While the various example embodiments of the present disclosure are discussed in connection with the Third Generation Partnership Project (3GPP) Fifth Generation (5G) New Radio (NR) wireless communication standard for the sake of clarity and convenience, the example embodiments are not limited thereto, and one of ordinary skill in the art would recognize the example embodiments may be applicable to other wireless communication standards.

2. Example Architecture of an NTN Communications System and an Example Structure of a Network Element Thereof.

Figure 1A:
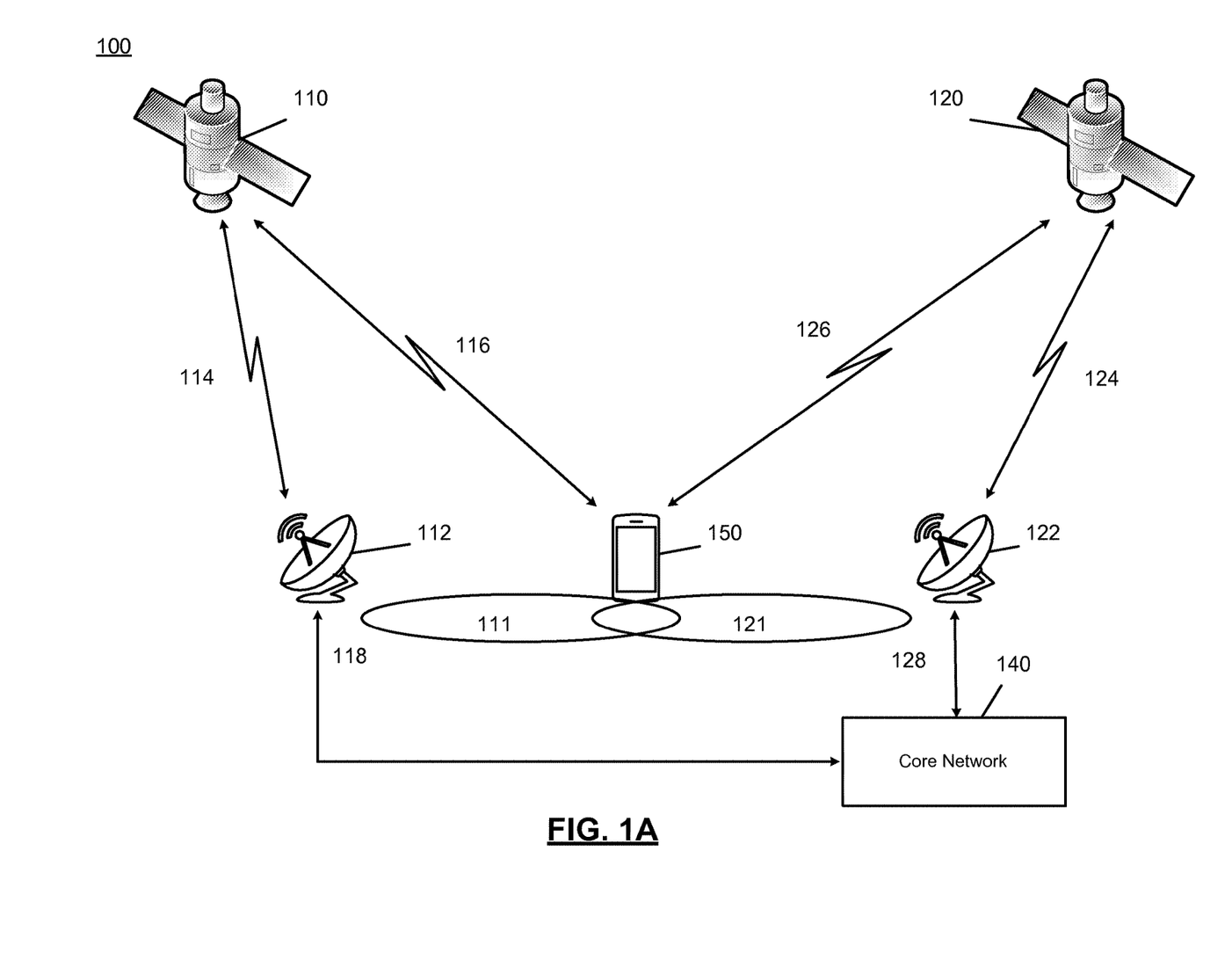
FIG. 1A is a diagram illustrating a portion of a wireless non-terrestrial network (NTN) communications system according to at least some example embodiments.

FIG. 1A illustrates a wireless NTN communications system 100 according to at least one example embodiment. As shown in FIG. 1, a wireless NTN communications system 100 includes a first NTN device 110, a second NTN device 120, a first NTN gateway 112, a second NTN gateway 122, a first user equipment (UE) 150, and a core network (CN) 140. The first and second NTN gateways 112 and 122 may perform bi-directional communication with the CN 140, for example, via first and second communications links 118 and 128, respectively. Further, the first and second NTN device 110 and 120 may perform wireless bi-directional communication with the first and second NTN gateways 112 and 122 via first and second wireless feeder links 114 and 124, respectively. Accordingly, the first and second NTN devices 110 and 120 may perform bi-directional communication with the CN 140 via the first and second NTN gateways 112 and 122, respectively. Additionally, the first UE 150 and the first NTN device 110 may communicate with each other through a first wireless service link 116, and the first UE 150 and the second NTN device 112 may communicate with each other through a second wireless service link 126.

Examples of the UE 150 include, but are not limited to, a mobile device, a tablet, a laptop computer, a wearable device, an Internet of Things (IoT) device, a desktop computer and/or any other type of stationary or portable device capable of operating according to the 5G NR communication standard, and/or other wireless communication standard. In the example illustrated in FIG. 1A, the UE is a mobile device.

Examples of a type of device that each of the first and second NTN devices 110 and 120 may be include, but are not limited to, a low earth orbit (LEO) satellite, a medium earth orbiting (MEO) satellite, a geostationary earth orbiting (GEO) satellite, an unmanned aerial system (UAS) device (e.g., a drone, a blimp, a balloon, etc.), a high altitude platform station (HAPS) vehicle, a manned aerial vehicle (MAV) device, etc. In the example illustrated in FIG. 1A, the first and second NTN devices 110 and 120 are each an LEO satellite, and thus, the first and second NTN devices 110 and 120 have the same device type. However, according to at least some example embodiments, device types of the first and second NTN devices 110 and 120 may be the same, or different, with respect to each other.

One or more beams of the first NTN device 110 may correspond to a first beam coverage area 111 which may define at least a portion of a geographical area of a first cell associated with the first NTN device 110. One or more beams of the second NTN device 120 may correspond to a second beam coverage area 121 which may define at least a portion of a geographical area of a second cell associated with the second NTN device 120.

According to at least some example embodiments, the first and second NTN devices 110 and 120 act as transceivers (e.g., transmission and reception points) for first and second gNBs (not illustrated), respectively. For example, according to at least some example embodiments, a transparent NTN architecture may be used. In the transparent NTN architecture, the first NTN device 110 and the first NTN gateway 112 act together as a remote radio unit of the first gNB, and thus, may relay bi-directional communications sent between the first gNB and UEs attached to the first gNB. As another example, according to at least some example embodiments, a gNB on-board regenerative NTN architecture may be used. In the gNB on-board regenerative NTN architecture, the first NTN device 110 embodies (i.e., includes the functionality of) the first gNB. For example, at least one distributed unit (DU) of the first gNB and a central unit (CU) of the first gNB may embodied together by the first NTN device 110. As yet another example, according to at least some example embodiments, a gNB-DU on-board regenerative NTN architecture may be used. In the gNB-DU on-board regenerative NTN architecture, the first NTN device 110 embodies at least one DU of the first gNB, and another node (not illustrated) may serve as a CU of the first gNB. Further, those skilled in the art will understand that one or both of the DU and CU of the first gNB may be separate from, or, alternatively, co-located with, the first NTN gateway 112. Additionally, the NTN architectures discussed above with reference to the first NTN device 110, first NTN gateway 112 and the first gNB may also apply to other NTN devices, NTN gateways and gNBs of the wireless NTN communications system 100 (e.g., the second NTN device 112, second NTN gateway 122 and the second gNB).

According to at least some example embodiments, the wireless NTN communications system 100 is not limited to the elements illustrated in FIG. 1 and the wireless NTN communications system, 100 may include numbers of constituent elements different than those shown in FIG. 1. For example, the wireless NTN communications system may include any number of UE devices, any number of NTN devices, any number of NTN gateways, etc.

Further, though not illustrated, the wireless NTN communications system 100 may further include 5G core (5GC) network elements (e.g., in the core network 140). For example, the first and second NTN gateways 112 and 122 (or, alternatively, gNBs or gNB-CUs connected to the first and second NTN gateways 112 and 122) may be connected to an access and mobility management function (AMF) element and/or a session management function (SMF) element. Additionally, though not illustrated, the wireless NTN communications system 100 may further include long-term evolution (LTE) network elements that are connected to one or more of the first and second NTN gateways 112 and 122 (or, alternatively, gNBs or gNB-CUs connected to the first and second NTN gateways 112 and 122). Examples of such LTE elements include, but are not limited to, LTE radio access technology (RAT) network elements (e.g., evolved universal mobile telecommunications system (UMTS) terrestrial radio access network (E-UTRAN) network elements) such as evolved node Bs (eNBs), and LTE core network elements (e.g., evolved packet core (EPC) network elements) such as mobility management entities (MMEs). An example structure which may be used to embody one or more radio network elements (e.g., gNBs, UEs, NTN devices, NTN gateways, gNB-CUs, etc.) of the wireless NTN communications system 100 will now be discussed below with respect to FIG. 1B.

Figure 1B:
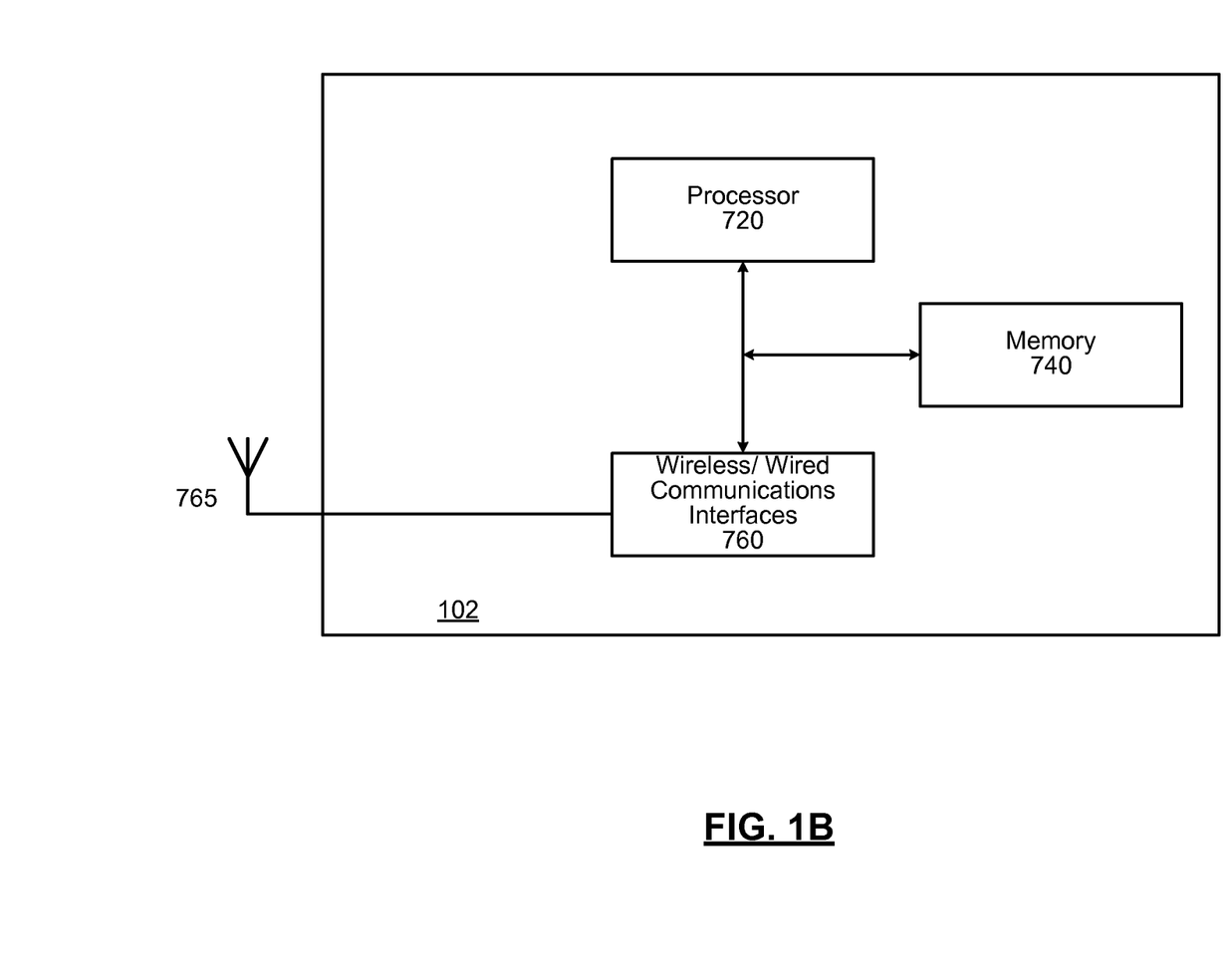
FIG. 1B illustrates a network element according to at least some example embodiments.

FIG. 1B illustrates an example embodiment of a network element. Referring to FIG. 1B, a network element 102 includes: a memory 740, a processor 720, and various communications interfaces 760 connected to each other; and one or more antennas or antenna panels 765 connected to the various communications interfaces 760. The various interfaces 760 and the antenna 765 may constitute a transceiver for transmitting/receiving data to/from a UE, a gNB, an NTN device, an NTN gateway, and/or another radio network element via one or more of a plurality of wireless beams. According to at least some example embodiments, in addition to, or alternatively, instead of, including interfaces for supporting wireless communications, various interfaces 760 may include interfaces for supporting wired communications.

As will be appreciated, depending on the implementation of the network element 102, the network element 102 may include many more components than those shown in FIG. 1B. However, it is not necessary that all of these generally conventional components be shown in order to disclose the illustrative example embodiment.

The memory 740 may be a computer readable storage medium that generally includes a random access memory (RAM), read only memory (ROM), and/or a permanent mass storage device, such as a disk drive. The memory 740 also stores an operating system and any other routines/modules/applications for providing the functionalities of the particular element of the wireless NTN communications system 100 being embodied by the network element 102

(e.g., functionalities of a UE, an NTN device, an NTN gateway, a gNB, etc. in accordance with one or more example embodiments) to be executed by the processor 720. These software components may also be loaded from a separate computer readable storage medium into the memory 740 using a drive mechanism (not shown). Such separate computer readable storage medium may include a disc, tape, DVD/CD-ROM drive, memory card, or other like computer readable storage medium (not shown). In some example embodiments, software components may be loaded into the memory 740 via one of the various interfaces 760, rather than via a computer readable storage medium.

The processor 720 may be configured to carry out instructions of a computer program by performing the arithmetical, logical, and input/output operations of the system. Instructions may be provided to the processor 720 by the memory 740.

The various interfaces 760 may include components that interface the processor 720 with the one or more antennas 765, or other input/output components. As will be understood, the various interfaces 760 and programs stored in the memory 740 to set forth the special purpose functionalities of the network element 102 will vary depending on the particular element of the wireless NTN communications system 100 being embodied by the network element 102.

The various interfaces 760 may also include one or more user input devices (e.g., a keyboard, a keypad, a mouse, or the like) and user output devices (e.g., a display, a speaker, or the like).

5G NR intra-frequency measurements and SMTCs will now be discussed in greater detail below.

3. Overview of 5G NR Intra-Frequency Measurements, Inter-Frequency Measurements, and SMTCs 3GPP technical specification (TS) 38.133 V16.3.0 (2020-03), section 9.2.1 discusses intra-frequency measurements. According to section 9.2.1, a measurement is defined as a synchronization signal block (SSB)-based intra-frequency measurement provided the center frequency of the SSB of the serving cell indicated for measurement and the center frequency of the SSB of the neighbor cell are the same, and the subcarrier spacing of the two SSBs are also the same. Further, according to section 9.2.1, a UE can perform intra-frequency SSB based measurements without measurement gaps if the SSB is completely contained in the active bandwidth part (BWP) of the UE, or the active downlink BWP is the initial downlink BWP. Additionally, according to section 9.2.1, SSB-based measurements are configured along with one or two SMTCs which provide periodicity, duration and offset information on a window of up to 5 ms where the measurements are to be performed. Further, 3GPP TS 38.133 V16.3.0 (2020-03), section 9.3.1 discusses inter-frequency measurements. According to section 9.3.1, a measurement is defined as an SSB based inter-frequency measurement provided it is not defined as an intra-frequency measurement. Additionally, according to section 9.3.1, SSB based measurements are configured along with an SMTC per carrier, which provides periodicity, duration and offset information on a window of up to 5 ms where the measurements on the configured inter-frequency carrier are to be performed.

Further, according to 3GPP TS 38.133 V16.3.0 (2020-03), a UE can measure 6-8 intra-frequency cells and 14-24 SSBs per measurement period (e.g., for Frequency Range 1 (FR1)-Frequency Range 2 (FR2), respectively).

According to 3GPP TS 38.331 V16.1.0 (2020-07), the SSB-MTC information element (IE) is structured as follows:

| SSB-MTC IE | |
|---|---|
| SSB-MTC ::= | SEQUENCE { |
| periodicityAndOffset | CHOICE { |
| sf5 | INTEGER (0..4), |
| sf10 | INTEGER (0..9), |
| sf20 | INTEGER (0..19), |
| sf40 | INTEGER (0..39), |
| sf80 | INTEGER (0..79), |
| sf160 | INTEGER (0..159) |
| }, | |
| duration | ENUMERATED { sf1, sf2, sf3, sf4, sf5 } |
| } | |

Even for a UE that does not require measurement gaps, the network must provide the SMTC. The duration of the SMTC window is limited to 5 subframes (according to 3GPP TS 38.331 V16.1.0 (2020-07)), which may be a challenge for NTN (note the SSB spans 4 orthogonal frequency-division multiplexing (OFDM) symbols). One reason is that in terrestrial networks the delay shifts over time are limited as they are caused by either UE movement or asymmetrical cell geometry (e.g., different distances from the UE to the serving and neighbor cells), so the temporal location the SSB of the neighbor cell relative to the temporal location of the SSB of the serving cell is fixed. In NTN, the delay to the serving cell may change several milliseconds (ms) over the time a cell is the serving cell. At the same time the neighbor cell's timing also changes (and not necessarily in the same direction). This is illustrated in FIG. 2.

Figure 2:
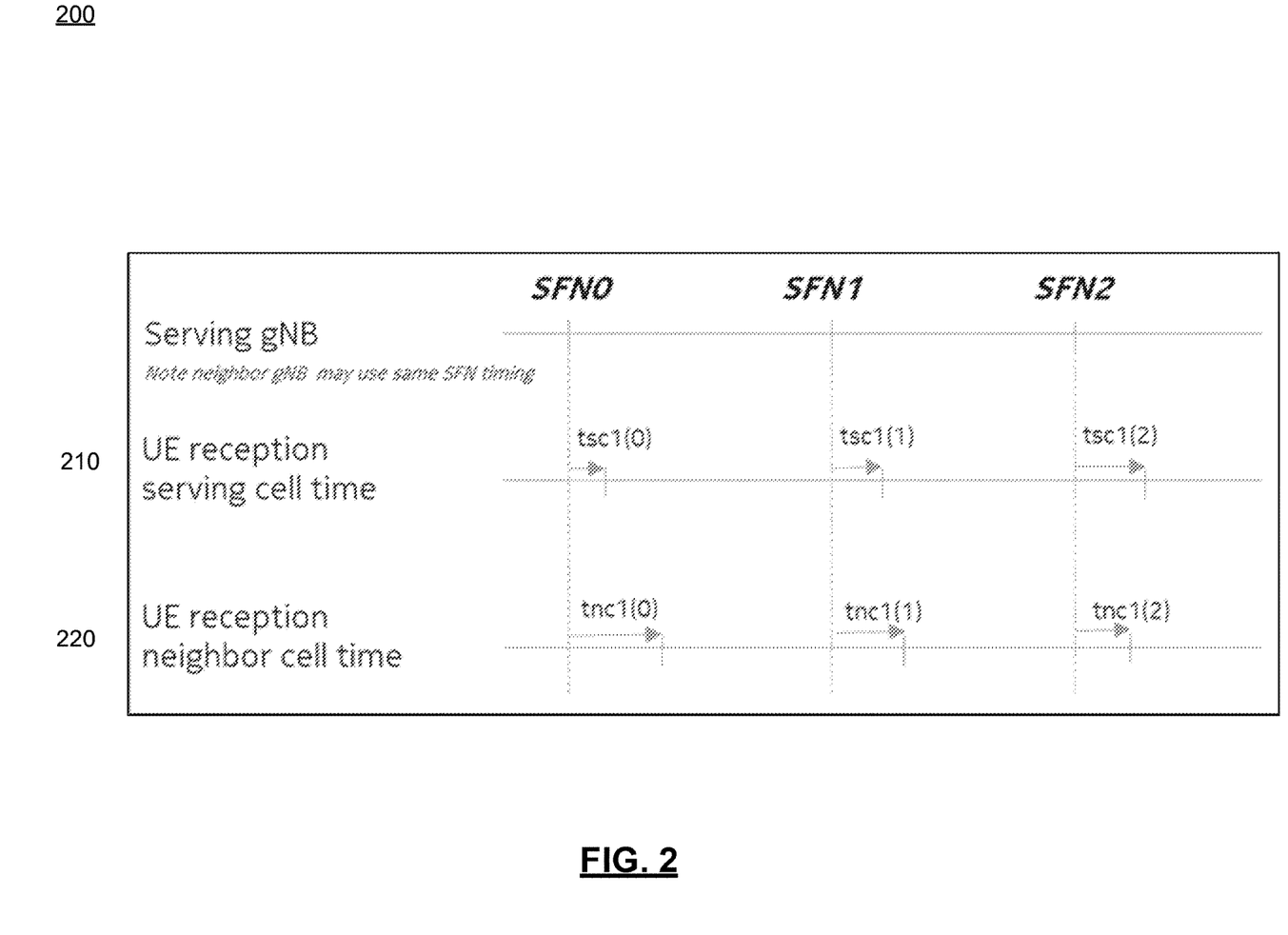
FIG. 2 is a chart for explaining timing shifts in user equipment (UE) reception times with respect to a serving cell and a neighboring cell in a NTN according to at least some example embodiments.

FIG. 2 is a chart for explaining timing shifts in user equipment (UE) reception times with respect to a serving cell and a neighboring cells in a NTN according to at least some example embodiments. FIG. 2 is explained below with respect to an example in which the first beam coverage area 111 of FIG. 1A is a serving cell 111 of the UE 150, the gNB associated with the first NTN device 110 is a serving gNB of the serving cell 111, the second beam coverage area 121 of FIG. 1A is a neighbor cell 121 of the UE 150, and the gNB associated with the second NTN device 120 is a neighbor gNB of the neighbor cell 121. As is discussed above with reference to FIG. 1A, a gNB associated with an NTN device may by fully embodied by the NTN device (e.g., gNB-DU and gNB-CU are included in the NTN device), partially embodied by the NTN device and partially embodied by a separate element (e.g., gNB-DU is included in the NTN device and gNB-CU is included in the separate network element), or fully embodied by a separate element or separate elements (e.g., gNB-DU and gNB-CU are included in the separate network element and are not included in the NTN device) depending on which type of NTN architecture (e.g., transparent, regenerative gNB on-board, or regenerative gNB-DU on-board) is employed.

Referring to FIG. 2, timing chart 200 illustrates the UE reception serving cell times 210 (i.e., tsc1(0)-tsc1(2)) and UE reception neighbor cell times 220 (i.e., tnc1(0)-tnc1(2)) for each of a plurality system frame numbers (SFNs) SFN0-SFN2 of the serving cell. In timing chart 200, SFNs SFN0-SFN2 serve as an index of time. The UE reception serving cell times 210 (i.e., tsc1(0)-tsc1(2)) indicate delays experienced by the UE 150 with respect to receiving signals transmitted to the UE 150 from the serving gNB (e.g., via or, alternatively, by the first NTN device 110). The UE reception neighbor cells times 220 (i.e., tnc1(0)-tnc1(2)) indicate delays experienced by the UE 150 with respect to receiving signals transmitted to the UE 150 from the neighbor gNB (e.g., via or, alternatively, by the second NTN device 120). In the example illustrated in FIG. 2, from system frame number SFN0-SFN2, the first NTN device 110 is moving away from the UE 150, and thus, the UE reception serving cell times 210 (i.e., tsc1(0)-tsc1(2)) increase over time. Further, in the example illustrated in FIG. 2, from system frame number SFN0-SFN2, the second NTN device 120 is moving towards the UE 150, and thus, the UE reception neighbor cell times 220 (i.e., tnc1(0)-tnc1(2)) decrease over time. The changing delays associated with the UE reception serving cell times 210 and the UE reception neighbor cell times 220 may result in SSB time drift since a temporal location of the SSB of the neighbor cell may drift over time with respect to a temporal location of the SMTC window of the UE 150.

Thus, in a scenario like that depicted in FIG. 2, it may be difficult to determine the right timing of the SMTC window such that the UE 150 can measure the neighboring cell correctly (i.e., such that the UE 150 can temporally align the SMTC window with the SSB of the neighbor cell). The aforementioned timing issues become further complicated in view of 3GPP Release (Rel.) 17 which focuses solely on transparent cells (i.e., the transparent NTN architecture in which the gNB is not on-board the NTN device), which means the delay from the feeder link (e.g., first and second feeder links 114 and 124 between first and second NTN gateways 112 and 122 and first and second NTN devices 110 and 120, respectively, in FIG. 1A), in addition to the delay already caused by the service link (e.g., first and second service links 116 and 126 between the UE 150 and the first and second NTN devices 110 and 120, respectively, of FIG. 1), may contribute to the aforementioned SSB time drift.

For example, with reference to FIG. 2, the timing of the SMTC window for the UE 150 in timing chart 200 is based on the UE reception serving cell times 210 (e.g., tsc1), while the UE 150 is trying to receive the SSB of the neighbor cell, which is related to the UE reception neighbor cell times 220 (e.g., tnc1).

A measurement window adjustment method according to at least some example embodiments will now be discussed in greater detail below.

4. Example Method for Adjusting a Measurement Window

As is discussed above, due to UE reception time shifting issues that may exist in NTN communications systems as a result of at least one of differing feeder link delays and differing service link delays with respect to a serving cell and a neighbor cell of a UE, SSB time drift may occur thus making it difficult to align an SMTC window properly so the UE can measure the SSB of the neighbor cell.

However, a measurement window adjustment method according to at least some example embodiments provides a mechanism for radio resource control (RRC)-connected UEs to autonomously adjust the SMTC (e.g. a temporal size and/or a temporal location of the SMTC window) by tracking the SSB time drift, and to signal the adjustments in a compressed format to the network (e.g., a gNB and/or the CN). According to at least some example embodiments, it is assumed that the UE can perform an initial SSB measurement based on the SMTC provided by the network, e.g. based on UE location and satellite ephemeris.

The measurement window adjustment method according to at least some example embodiments will now be discussed in greater detail below with reference to FIGS. 3-5.

Figure 3:
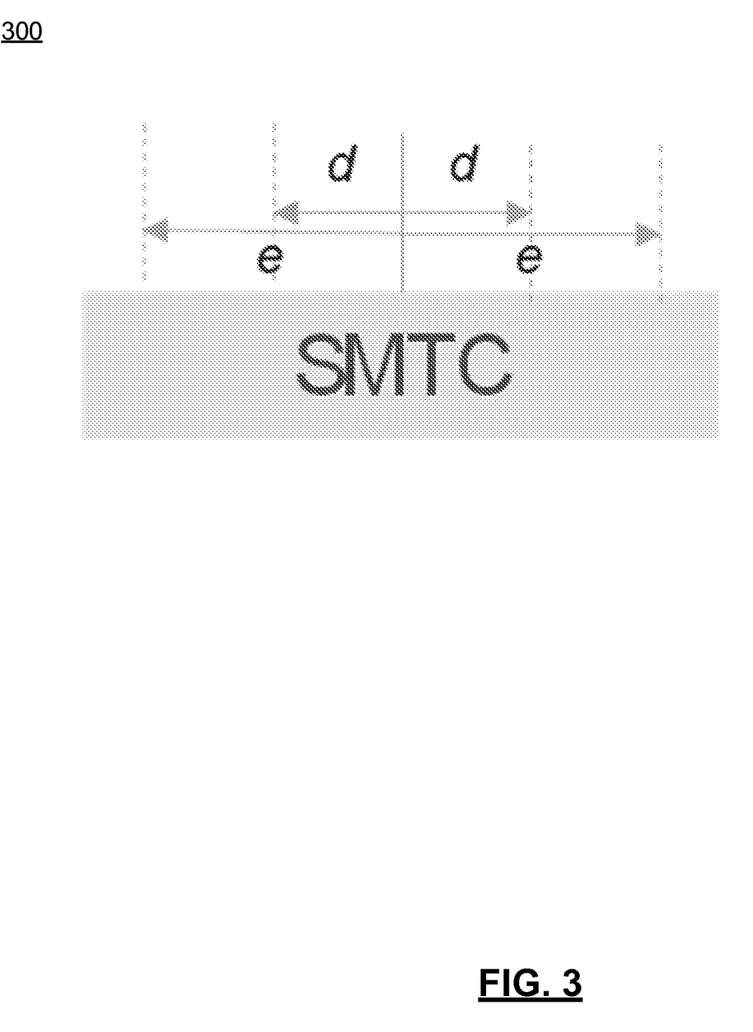
FIG. 3 is a diagram illustrating examples of first and second timing thresholds with respect to a synchronization signal block (SSB) measurement timing configuration (SMTC) according to at least some example embodiments.

FIG. 3 is a diagram illustrating examples of first and second timing thresholds with respect to an SMTC window 300 according to at least some example embodiments. FIG. 4 is a flowchart illustrating a method of operating a UE to adjust a SMTC window to address SSB time drift according to at least some example embodiments. FIG. 5 is a diagram for an explaining an example of adjusting an SMTC window to address SSB time drift according to at least some example embodiments. FIGS. 3-5 are explained below with respect to an example in which the first beam coverage area 111 of FIG. 1A is a serving cell 111 of the UE 150, the gNB associated with the first NTN device 110 is a serving gNB of the serving cell 111, the second beam coverage area 121 of FIG. 1A is a neighbor cell 121 of the UE 150, and the gNB associated with the second NTN device 120 is a neighbor gNB of the neighbor cell 121.

Referring to FIG. 3, according to at least some example embodiments, an SMTC provided to the UE 150 by the network (e.g., by the serving gNB associated with the first NTN device 110) may be provided along with one or more timing thresholds. In the example illustrated in FIG. 3, an SMTC window 300 is illustrated along with a first timing threshold "d" and a second timing threshold "e." According to at least some example embodiments, the first and second timing thresholds "d" and "e" are timing misalignment thresholds which will be used by the UE 150 to determine whether an SMTC window is temporally misaligned with respect to an SSB of the neighboring cell and, if so, a degree of the temporal misalignment.

Figure 4:
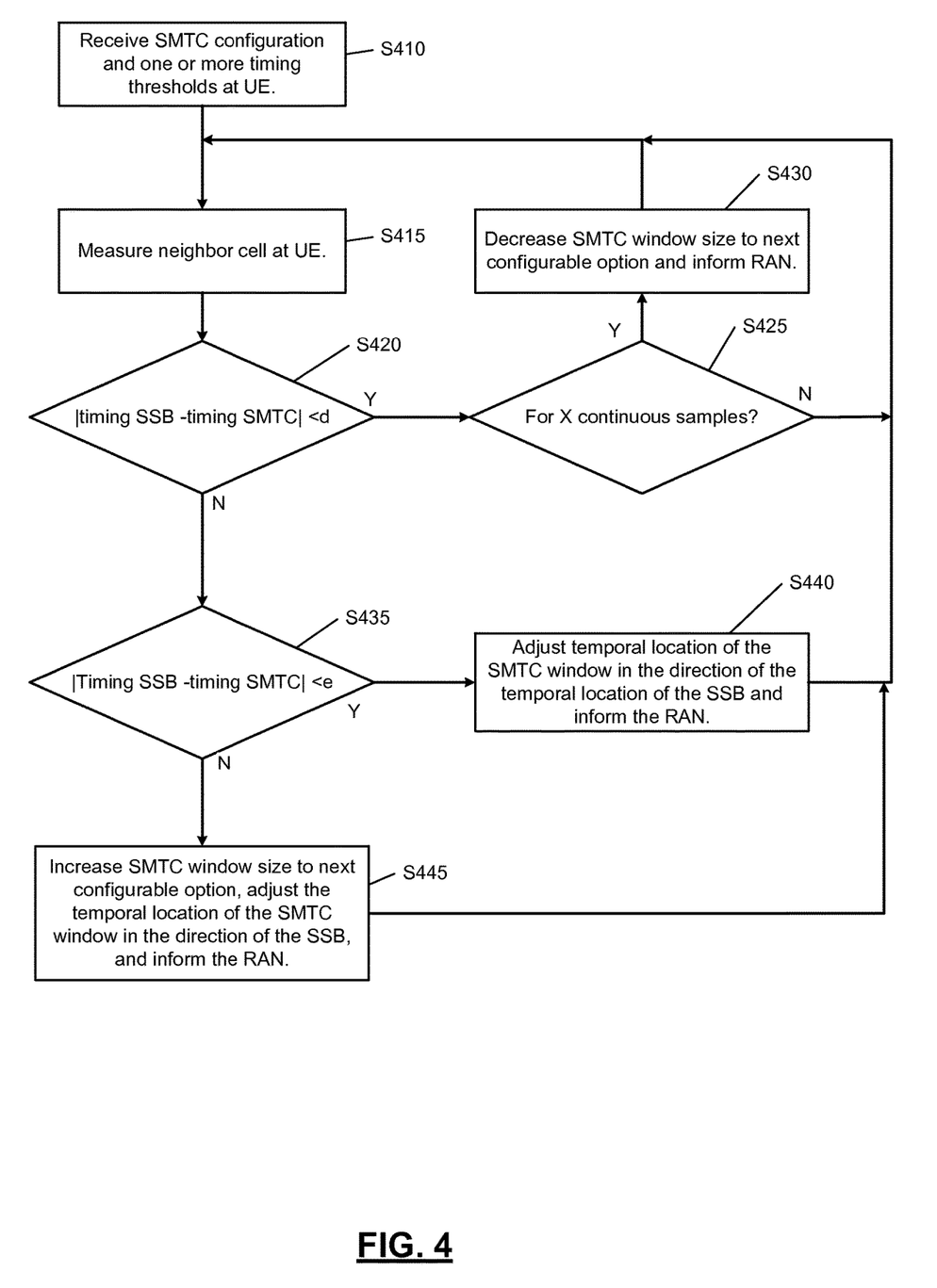
FIG. 4 is a flowchart illustrating a method of operating a UE to adjust an SMTC window to address SSB time drift according to at least some example embodiments.

Referring to FIG. 4, in step S410 the UE 150 receives an SMTC and one or more timing misalignment thresholds. For example, in step S410 the first NTN device 110 may provide the UE 150 with signaling from the serving gNB that includes parameters of an SMTC window (e.g., the parameters included in the SSB-MTC IE defined in 3GPP TS 38.331 V16.1.0 (2020-07)) as well as a first timing threshold "d" and a second timing threshold "e." According to at least some example embodiments, the wireless NTN communications system (e.g., the serving gNB or the CN 140) may set that magnitudes of the first and second timing thresholds such that the magnitude of the first timing threshold "d" is less than the magnitude of the second timing threshold "e." After step S410, the UE 150 proceeds to step S415.

In step S415, the UE 150 may measure the neighbor cell 121. For example, based on an initial SMTC received from the serving gNB, the UE 150 may receive reference information corresponding to the neighbor cell 121 that is sent to the UE 150 by the neighbor gNB via the second NTN device 120. An example of the reference information received by the UE 150 is an SSB of the neighbor cell 121. According to at least some example embodiment, the UE 150 may use the initial SMTC received in step S410 to obtain the initial SSB of the neighbor cell. In step S415, the UE 150 may use the SSB of the neighbor cell 121 to perform signal strength and/or quality measurements with respect to the neighbor cell 121 in accordance with known methods. After step S415, the UE 150 proceeds to step S420.

In step S420, the UE 150 determines whether the absolute value of a difference between a timing of the SMTC window and a timing of the SSB exceeds the first timing threshold value "d" (e.g., the UE 150 determines whether |timing SSB−timing SMTC|<d). According to at least some example embodiments, "timing of the SSB" or "timing SSB" refers to a temporal position of a center of the SSB and "timing of the SMTC window" or "timing SMTC" refers to a temporal position of a center of the SMTC window. According to at least some example embodiments, the UE 150 knows the duration of the SSB, the UE 150 can track the time at which the UE 150 begins receiving the SSB, and thus, the UE 150 can determine a temporal position of a center of the SSB. Further, according to at least some example embodiments, the UE 150 knows the duration of the SMTC window, the UE 150 knows when the SMTC window begins, and thus, the UE 150 can determine a temporal position of a center of the SMTC window.

If, in step S420, the UE 150 determines that [|timing SSB−timing SMTC|<d] is true (i.e., Y in step S420), then the UE 150 proceeds to step S425. In step S425, the UE 150 determines if [|timing SSB−timing SMTC|<d] has been true for at least X continuous iterations of comparing timings of the SSB of the neighbor cell and the SMTC window. If so (i.e., Y in step S425), the UE 150 proceeds to step S430. According to at least some example embodiments, the continuous iteration threshold X is a positive integer the value of which is set in accordance with the preferences of a designer and/or operator of the wireless NTN communications system 100.

According to at least some example embodiments, there are a number of possible ways by which the UE 150 may obtain the continuous iteration threshold X. For example, the continuous iteration threshold X may be sent to the UE 150 from the RAN (e.g., the serving gNB of the serving cell 111) prior to step S425 (e.g., in step S410). As another example, the continuous iteration threshold X may defined by specification (e.g., 3GPP 5G NR specification). As yet another example, the continuous iteration threshold X may be determined by the UE 150. For example, according to at least some example embodiments, the UE 150 may selectively set a value of the continuous iteration threshold X based on one or more of a number of UE measurements and/or UE conditions such as an amount of power consumption associated with measuring the SSBs at the UE 150, a current battery level of the UE 150, etc.

In step S430, the UE 150 decreases a duration of the SMTC window to a next lowest configurable option and the UE 150 informs the RAN (e.g., the serving gNB of the serving cell 111) of the new parameters of the SMTC window. For example, according to 3GPP TS 38.331 V16.1.0 (2020-07), the SS-MTC IE includes 5 possible configurations for a duration of the SMTC window (i.e., 1 subframe-5 subframes). Thus, in step S430, the UE 150 may reduce a duration of the SMTC window by 1 subframe (e.g., from 5 subframes to 4 subframes, 4 subframes to 3 subframes, etc.) unless the duration is already set to the lowest configurable value (e.g., 1 subframe), in which case the UE 150 does not reduce the duration of the SMTC window further in step S430. After step S430, the UE returns to step S415 and the next measurement of the SSB of the neighbor cell 121 is performed.

For example, the UE 150 may decrease the SMTC window size in step S430 because |timing SSB−timing SMTC| being less than the first timing threshold "d" for at least a reference number X continuous iterations of comparing timings of the SSB of the neighbor cell and the SMTC window may be an indication that the duration of the SMTC window is larger than it needs to be, and thus, can be reduced. Reduction of the duration of the SMTC window may, for example, improve the battery life (e.g., reduce the power consumption) of the UE 150. As another example, reduction of the duration of the SMTC window may increase scheduling flexibility of the serving cell, because, in some scenarios, the UE 150 cannot be scheduled when the UE 150 is performing a measurement operation.

Returning to step S425, if the UE 150 determines that [|timing SSB−timing SMTC|<d] has been true for less than X continuous iterations of comparing timings of the SSB of the neighboring cell and the SMTC window (i.e., N in step S425), the UE 150 does not proceed to step S430. For example, after step S425, the UE 150 returns to step S415 and performs the next iteration of measuring the SSB of the neighbor cell 121.

Returning to step S420, the UE 150 determines that [|timing SSB−timing SMTC|<d] is false (i.e., N in step S420), then the UE 150 proceeds to step S435.

In step S435, the UE 150 determines whether the absolute value of the difference between a timing of the SMTC window and the timing of the SSB exceeds the second timing threshold value "e" (e.g., the UE 150 determines whether |timing SSB−timing SMTC|<e).

If, in step S435, the UE 150 determines that [|timing SSB−timing SMTC|<e] is true (i.e., Y in step S435), then the UE 150 proceeds to step S440. In step S440, the UE 150 adjusts a temporal location of the SMTC window in the direction of the temporal location of the SSB and informs the RAN of the new parameters of the SMTC window. For example, in step S440, the UE 150 may increase or decrease an offset of the SMTC window depending on whether the temporal position of the center of the SSB is in front of or behind the temporal position of the center of the SMTC window. Further, in step S440, the UE 150 may send a message to the RAN (e.g., the serving gNB of the serving cell 111) indicating the adjusted value of the offset of the SMTC window. After step S440, the UE 150 returns to step S415 and performs the next iteration of measuring the SSB of the neighbor cell 121 using the adjusted SMTC window (i.e., the SMTC window with the adjusted value of the offset from step S445).

Returning to step S435, if the UE 150 determines that [|timing SSB−timing SMTC|<e] is false (i.e., N in step S435), then the UE 150 proceeds to step S445. In step S445, the UE 150 increases the size of the SMTC window to the next configurable option (e.g., by increasing the duration of the SMTC window by one subframe), the UE 150 adjusts the temporal location of the SMTC window in the direction of the temporal location of the SSB (e.g., by increasing or decreasing the offset value of the SMTC window depending on whether the temporal position of the center of the SSB is in front of or behind the temporal position of the center of the SMTC window), and the UE 150 informs the RAN (e.g., the serving gNB of the serving cell 111) of the new parameters of the SMTC window. For example, the UE 150 may send a message to the RAN (e.g., the serving gNB of the serving cell 111) indicating the adjusted values of the offset and duration of the SMTC window. After step S445, the UE 150 returns to step S415 and performs the next iteration of measuring the SSB of the neighbor cell 121 using the adjusted SMTC window (i.e., the SMTC window with the adjusted values of the offset and duration from step S445).

For example, the UE 150 may increase the SMTC window size in step S445 because |timing SSB−timing SMTC| being greater than the second timing threshold "e", which is the larger timing threshold of the first and second timing thresholds "d" and "e," may be an indication that SSB time drift is causing a misalignment between the current SMTC window and the SSB (e.g., a difference between the temporal locations of the centers of the SMTC window and the SSB, respectively) to grow so much larger and/or change so fast that merely adjusting the temporal location of the center of the SMTC window may not be sufficient, and thus, the size of the SMTC window should be increased as well.

Figure 5:
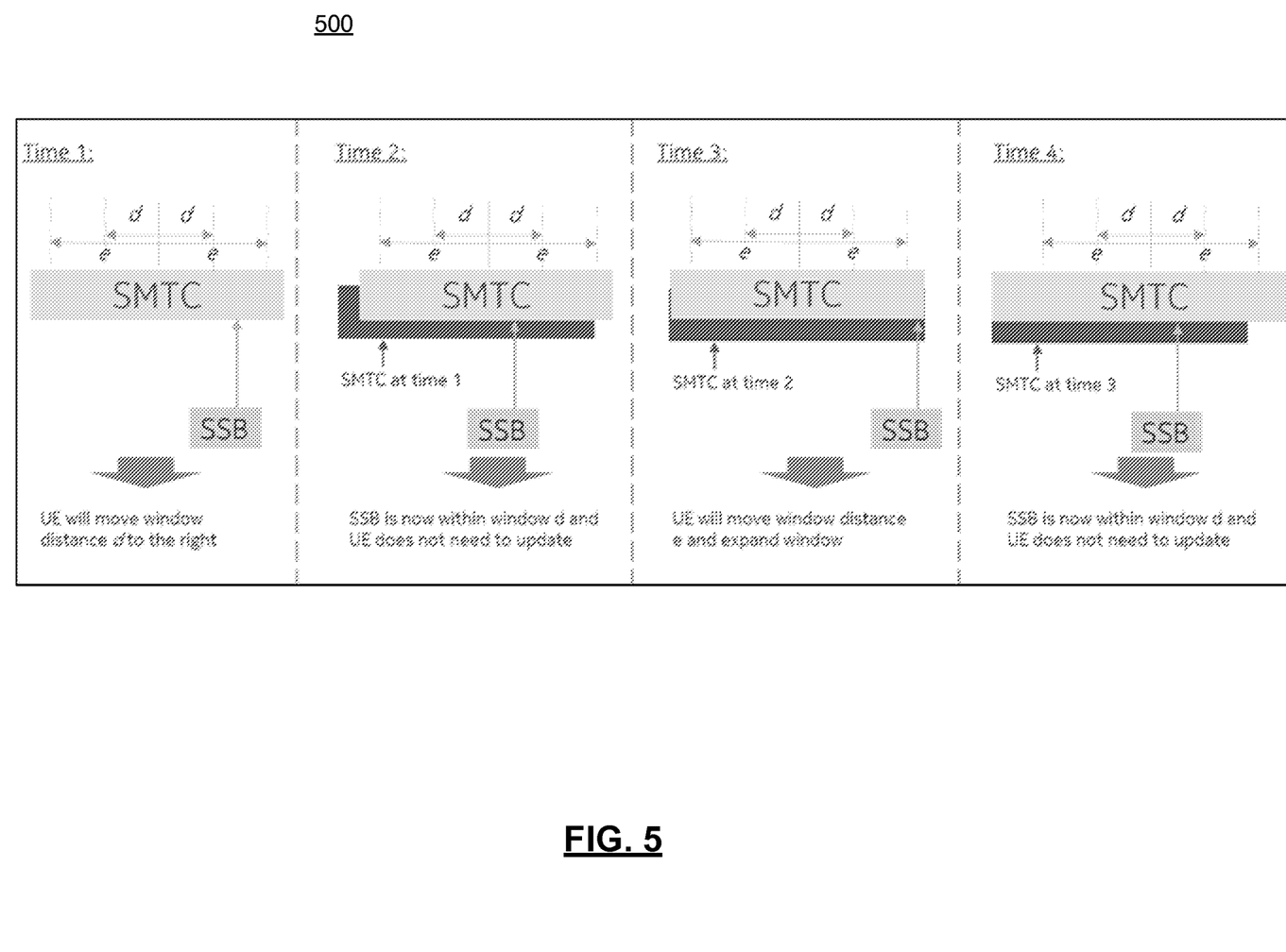
FIG. 5 is a diagram for an explaining an example of adjusting an SMTC window to address SSB time drift according to at least some example embodiments.

Accordingly, referring to FIGS. 4 and 5:

1) when the UE 150 determines that |timing SSB−timing SMTC| is not less than the first timing threshold "d" (i.e., N in step S420) but is less than the second timing threshold "e" (i.e., Y in step S435), as shown, for example, by Time 1 in timing alignment explanation diagram 500 of FIG. 5,
    a) the UE 150 adjusts the SMTC window by moving the temporal position of the center of the SMTC window closer to the temporal position of the center of the SSB (i.e., step S440), as is shown, for example, by Time 2 in timing alignment explanation diagram 500 of FIG. 5;

2) when the UE 150 determines that |timing SSB−timing SMTC| is not less than the first timing threshold "d" (i.e., N in step S420) and is not less than the second timing threshold "e" (i.e., N in step S435), as shown, for example, by Time 3 in timing alignment explanation diagram 500 of FIG. 5,
    a) the UE 150 adjusts the SMTC window by moving the temporal position of the center of the SMTC window closer to the temporal position of the center of the SSB (i.e., step S445), as is shown, for example, by Time 4 in timing alignment explanation diagram 500 of FIG. 5, and
    b) the UE 150 adjusts the SMTC window by increasing the size (i.e., the duration) of the SMTC window (i.e., step S445), as is also shown, for example, by Time 4 in timing alignment explanation diagram 500 of FIG. 5; and 3) when the UE 150 determines that |timing SSB−timing SMTC| is less than the first timing threshold "d" (i.e., Y in step S420),
    a) the UE 150 adjusts the SMTC window by decreasing the size (i.e., the duration) of the SMTC window (i.e., step S430) if the UE 150 further determines that |timing SSB−timing SMTC| has been less than the first timing threshold "d" for at least a reference number X of iterations of measuring the SSB of the neighbor cell 121 (i.e., Yin step S425).

According to at least some example embodiments, SMTC window adjustments made by the UE 150 take effect at a next time the SSB of the neighbor cell is measured (e.g., a subsequent iteration of S415).

Further, according to at least some example embodiments, it is not necessary that the temporal positions of the centers of the SMTC window and the SSB of the neighbor cell be the same in order for the UE 150 to measure the SSB of the neighbor cell. For example, the UE 150 may measure the SSB of the neighbor cell so long as the SSB is within the SMTC window. However, by tracking the magnitude of the difference between the temporal positions of the centers of the SMTC window and the SSB (i.e., |timing SSB−timing SMTC|), the UE 150 can detect SSB time drift early, and thus, respond to the detected SSB time drift by adjusting the temporal position and/or temporal size of the SMTC window before the effects of the SSB time drift become so great that the SSB of the neighbor cell falls outside of the SMTC window.

Further, according to at least some example embodiments, the UE 150's reporting of the adjusted SMTC parameters to the RAN (e.g., the serving gNB of the serving cell 111), as is done in steps S430, S440 and S445, is accomplished by new, light-weight uplink signaling from the UE 150 to the RAN. According to at least some example embodiments, the new uplink signaling for reporting the updated SMTC window parameters to the RAN is implemented using a relatively small number of bits. For example, the new uplink signaling may be implemented in the form of an SMTC parameter update report sent by the UE 150 to the RAN. For example, the SMTC parameter update report may include the following:
    One bit to indicate whether a size of the SMTC window is being increased or not;
    One bit to indicate whether a size of the SMTC window is being decreased or not (note that the window size can also be reset e.g. at handover)
    2 or more bits to indicate whether a temporal position of the SMTC window is adjusted (i.e., whether an offset value of the SMTC window is being changed), the direction of the movement (i.e., whether the offset value is being increased or decreased), and the magnitude of the movement (i.e., the amount by which the offset value is being increased or decreased). The number of bits depends on the number of possible step sizes of the movement (i.e., the number of possible increments by which the value of the offset may be increased or decreased during a single iteration of adjusting the temporal position of the SMTC window).

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided above to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

As discussed herein, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing UE, base stations, eNBs, RRHs, gNBs, femto base stations, network controllers, computers, Central Units (CUs), ng-eNBs, other radio access or backhaul network elements, or the like. Such existing hardware may be processing or control circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium," "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine-readable mediums for storing information. The term "computer readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause a network element or network device to perform the necessary tasks. Additionally, the processor, memory and example algorithms, encoded as computer program code, serve as means for providing or causing performance of operations discussed herein.

A code segment of computer program code may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

The terms "including" and/or "having," as used herein, are defined as comprising (i.e., open language). The term "coupled," as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

According to example embodiments, UEs, base stations, eNBs, RRHs, gNBs, femto base stations, network controllers, computers, Central Units (CUs), ng-eNBs, other radio access or backhaul network elements, or the like, may be (or include) hardware, firmware, hardware executing software or any combination thereof. Such hardware may include processing or control circuitry such as, but not limited to, one or more processors, one or more CPUs, one or more controllers, one or more ALUs, one or more DSPs, one or more microcomputers, one or more FPGAs, one or more SoCs, one or more PLUs, one or more microprocessors, one or more ASICs, or any other device or devices capable of responding to and executing instructions in a defined manner.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

What is claimed is:

1. A method of operating a user equipment (UE) having a serving cell and a neighbor cell included in a wireless communications system, the method comprising:
receiving, by the UE, parameters defining a measurement window;
receiving, by the UE, one or more timing thresholds;
performing a measurement operation with respect to the neighbor cell by measuring reference information of the neighbor cell in accordance with the measurement window;
determining, by the UE, whether to adjust one or more of the parameters of the measurement window based on a temporal position of the reference information and the one or more timing thresholds; and
adjusting one or more of the parameters of the measurement window based on the determining, wherein the measurement window is a synchronization signal block (SSB) measurement timing configuration (SMTC) window,
wherein the reference information of the neighbor cell is an SSB of the neighbor cell,
wherein,
the one or more timing thresholds include a first timing threshold,
the parameters of the measurement window include a temporal position of the of the measurement window,
the determining includes performing a comparison based on the first timing threshold and a first timing difference,
the first timing difference is an absolute value of a difference between a temporal position of the SSB and a temporal position of the SMTC window, and
the adjusting includes adjusting the temporal position of the SMTC window such that the temporal position of the SMTC window is closer to the temporal position of the SSB, in response to determining that the first timing difference is not less than the first timing threshold.

2. The method of claim 1,
wherein the wireless communications system is a wireless non-terrestrial network (NTN) communications system,
wherein the wireless communications system further includes one or more satellites, and wherein the UE communicates with at least one of the serving cell and the neighbor cell via at least one of the one or more satellites.

3. The method of claim 2, wherein one or more satellites are low earth orbit (LEO) satellites.

4. The method of claim 1,
wherein the serving cell is a cell of a serving base station (BS), and
wherein the method further comprises:
reporting, by the UE, the adjusted one or more parameters of the measurement window to the serving BS.

5. The method of claim 1 wherein,
the parameters of the measurement window further include a duration of the of the measurement window, and
the adjusting includes decreasing the duration of the SMTC window in response to determining that the first timing difference has been less than the first timing threshold for at least a reference number of iterations of performing the measurement operation.

6. The method of claim 1 wherein,
the one or more timing thresholds is a plurality of timing thresholds and further includes a second timing threshold that is greater than the first timing threshold,
the parameters of the measurement window further include a duration of the of the measurement window,
the determining further includes performing a comparison based on the second timing threshold and the first timing difference, and
the adjusting further includes increasing the duration of the SMTC window in response to determining that the first timing difference is not less than the second timing threshold.

7. The method of claim 1,
wherein the serving cell is a cell of a serving base station (BS), and
wherein the parameters defining the measurement window and the one or more timing thresholds are received at the UE from the serving BS.

8. A user equipment (UE) having a serving cell and a neighbor cell included in a wireless non-terrestrial network (NTN) communications system, the UE comprising:
at least one processor; and at least one memory storing computer-executable instructions; the at least one memory and the computer-executable instructions configured to, with the at least one processor, cause the UE at least to:
receive parameters defining a measurement window,
receive one or more timing thresholds,
perform a measurement operation with respect to a neighbor cell by measuring reference information of the neighbor cell in accordance with the measurement window,
determine whether to adjust one or more of the parameters of the measurement window based on a temporal position of the reference information and the one or more timing thresholds, and
adjust one or more of the parameters of the measurement window based on the determining,
wherein the measurement window is a synchronization signal block (SSB) measurement timing configuration (SMTC) window,
wherein the reference information of the neighbor cell is an SSB of the neighbor cell,
wherein,
the one or more timing thresholds include a first timing threshold,
the parameters of the measurement window include a temporal position of the of the measurement window,
the determining includes performing a comparison based on the first timing threshold and a first timing difference,
the first timing difference is an absolute value of a difference between a temporal position of the SSB and a temporal position of the SMTC window, and
the adjusting includes adjusting the temporal position of the SMTC window such that the temporal position of the SMTC window is closer to the temporal position of the SSB, in response to determining that the first timing difference is not less than the first timing threshold.

9. The UE of claim 8, wherein the wireless NTN communications system further includes one or more satellites, and communications received at the UE from at least one of the serving cell and the neighbor cell are received via at least one of the one or more satellites.

10. The UE of claim 9, wherein one or more satellites are low earth orbit satellites.

11. The UE of claim 8, wherein the computer-executable instructions further include: reporting the adjusted one or more parameters of the measurement window to a base station of a serving cell of the UE.

12. The UE of claim 8 wherein,
the parameters of the measurement window further include a duration of the of the measurement window, and
the adjusting includes decreasing the duration of the SMTC window in response to determining that the first timing difference has been less than the first timing threshold for at least a reference number of iterations of performing the measurement operation.

13. The UE of claim 8 wherein,
the one or more timing thresholds is a plurality of timing thresholds and further includes a second timing threshold that is greater than the first timing threshold,
the parameters of the measurement window further include a duration of the of the measurement window, the determining further includes performing a comparison based on the second timing threshold and the first timing difference, and the adjusting further includes increasing the duration of the SMTC window in response to determining that the first timing difference is not less than the second timing threshold.

14. The UE of claim 8, wherein the receiving of the parameters defining the measurement window and the one or more timing thresholds includes receiving the parameters defining the measurement window and the one or more timing thresholds from a base station of the serving cell of the UE.

* * * * *